United States Patent
Stephan (10) Patent No.: US 9,100,267 B2
(45) Date of Patent: Aug. 4, 2015

(54) NETWORK MANAGEMENT METHOD, A SYSTEM AND A DEVICE

(75) Inventor: Emile Stephan, Pleumeur Bodou (FR)

(73) Assignee: ORANGE, Paris (FR)

( * ) Notice: Subject to any disclaimer, the term of this patent is extended or adjusted under 35 U.S.C. 154(b) by 1126 days.

(21) Appl. No.: 11/666,278

(22) PCT Filed: Oct. 14, 2005

(86) PCT No.: PCT/FR2005/002559
§ 371 (c)(1),
(2), (4) Date: Dec. 4, 2007

(87) PCT Pub. No.: WO2006/045918
PCT Pub. Date: May 4, 2006

(65) Prior Publication Data
US 2008/0307080 A1    Dec. 11, 2008

(30) Foreign Application Priority Data
Oct. 25, 2004    (FR) ..................... 04 11357

(51) Int. Cl.
*G06F 15/173*    (2006.01)
*H04L 12/24*    (2006.01)

(52) U.S. Cl.
CPC .............. *H04L 41/00* (2013.01); *H04L 12/24* (2013.01)

(58) Field of Classification Search
CPC ..... H04L 41/00; H04L 41/0213; H04L 12/24; H04L 12/2602
USPC .................................. 709/223, 224
See application file for complete search history.

(56) References Cited

U.S. PATENT DOCUMENTS

| 5,291,583 A | 3/1994 | Bapat |
| 5,913,037 A * | 6/1999 | Spofford et al. .............. 709/226 |
| 6,055,243 A * | 4/2000 | Vincent et al. ................ 370/466 |
| 6,170,005 B1 * | 1/2001 | Meandzija .................... 709/217 |

(Continued)

FOREIGN PATENT DOCUMENTS

| WO | WO 02/079983 A3 | 10/2002 | |
| WO | WO 2005/034429 A1 * | 4/2005 | ............. H04L 12/24 |

OTHER PUBLICATIONS

Quittek, J. et al. "Requirements for IP Flow Information Report". draft-ietf-ipfix-reqs-16.txt. Jun. 2004. pp. 1-32.*

(Continued)

*Primary Examiner* — John Macilwinen
(74) *Attorney, Agent, or Firm* — Knobbe Martens Olson & Bear LLP (57) ABSTRACT

A device manages a management database in the form of objects to be managed that are referenced according to a reference specification. Equipment exchanges management data in the form of data structures indicated by patterns each corresponding to a respective referenced object and being assigned a respective identifier. In order to manage a given object, the device and the equipment store synchronization information associating the reference of the given object and the corresponding pattern identifier. In order to manage a given object, the equipment sends the corresponding pattern assigned the respective identifier and a data ticket which has a structure indicated by said pattern and is assigned said identifier. The device translates the pattern into the respective referenced object as a function of the identifier of said pattern and the synchronization information, and then stores the data from the received ticket in the management database.

12 Claims, 3 Drawing Sheets

(56) References Cited

U.S. PATENT DOCUMENTS

| | | | |
|---|---|---|---|
| 6,363,421 B2* | 3/2002 | Barker et al. | 709/223 |
| 6,519,635 B1 | 2/2003 | Champlin et al. | |
| 6,944,657 B1* | 9/2005 | Taghadoss | 709/224 |
| 2007/0274213 A1* | 11/2007 | Stephan et al. | 370/235 |

OTHER PUBLICATIONS

B. Claise. "Cisco Systems NetFlow Services Export Version 9". pp. 1-29. Apr. 2004.*

Quittek, et al. Oct. 2004. Informational IPFIX Requirements. Requirements for IP Flow Information Report (IPFIX). Network Working Group, Request for Comments: 3917, Swinburne University. 31 pages.

Libipfix C-library download site retrieved on May 2, 2013 from http://www.sourceforge.net/projects/libipfix/. No page numbers. 2 pages.

Software Engineering Institute. 2006-2013. YAF. CERT NetSA Security Suite, Monitoring for Large-Scale Networks. Carnegie Mellon University. Retrieved on May 2, 2013 from http://www.tools.netsa.cert.org/yaf/. 11 pages.

* cited by examiner

NETWORK MANAGEMENT METHOD, A SYSTEM AND A DEVICE

This application claims priority from PCT/FR2005/002559, filed Oct. 14, 2005 and French Application No. 0411357, filed Oct. 25, 2004, which are hereby incorporated by reference in their entirety.

FIELD OF THE INVENTION

The present invention relates to the field of managing equipments for accessing a communications network.

BACKGROUND OF THE INVENTION

A network generally comprises equipments to be managed and a device for managing those equipments.

Network management is based on the management device and the equipments to be managed exchanging information. Thus the management device can send commands to one or more network equipments, in particular to request modification of configuration parameters, or merely to consult certain configuration parameters of the network equipments. The network equipments prompted in this way generally modify the parameters on receiving a modification request or send requested information on receiving an information request. The network equipments are also adapted to send information spontaneously to the management device, such as in particular information relating to alarms.

The data exchanged in this way must be comprehensible to the sender and to the receiver. To this end, a network conventionally uses a management information base (MIB) reference model of such management information.

An MIB specifies a management information model in the form of objects to be managed in relation to parameters to be consulted, parameters to be modified, or alarms to be sent. These objects are specified by the International Standardization Organization (ISO) in the form of an object record tree. Thus a reference is assigned to each object specified in the MIB.

As a function of the type of management required, it is possible to refer to only a portion of the MIB tree, below called the "MIB portion".

The MIB contains individual scalar objects that can be instantiated once only, and groups of objects that can be instantiated a varying number of times, these groups being conventionally represented in the form of tables in which each row represents one instance of the group of objects. Each row is then identified by an index.

In a management network, the equipments and the management device generally know the MIB portion in accordance with which they manage their own management data. Thus a network is conventionally managed on the basis of a model of the above type, with knowledge thereof being shared by the management device and the network equipments to be managed.

A standardized protocol such as the simple network management protocol (SNMP) is generally used to send this information between the equipments and the management device. This kind of protocol is suited to exchanging management data relating to objects specified in the MIB, but it occupies considerable transmission bandwidth in the network. About 75% of the size of each message corresponds to 'Abstract Syntax Notation 1'/'Basic encoding rule' (ASN.1/BER) references.

SUMMARY OF THE INVENTION

The present invention aims to make managing management information in a network even more flexible.

A first aspect of the present invention proposes a method of managing of an equipment by a management device in a communications network.

The management device manages a management database in the form of objects to be managed referenced in accordance with a reference specification.

The equipment exchanges management data in the form of data structures indicated by patterns, each of which corresponds to a respective referenced object and is assigned a respective identifier.

To manage a given object, the management device and the equipment store the same synchronization information associating the reference of the given object and the identifier of the corresponding pattern.

The method comprises the following steps for managing the given object:

sending from the equipment to the management device the corresponding pattern to which the respective identifier is assigned and a data ticket having a structure indicated by said pattern and assigned said identifier;

translating the pattern received by the management device into the respective referenced object as a function of said synchronization information and then, on the basis of the translation, storing the data of the received ticket in the management information base of the device.

The term "object" refers to a model of a resource to be managed in the network, such as software or hardware of a network equipment, for example.

By means of the above features, a management device is able to manage a network equipment that sends management data to the device in a form that differs from the reference specification. On the basis of the synchronization information that is known to and shared by the management device and the equipment and which associates the identifier of a given pattern and the reference of the corresponding object, the device is able to receive and process management data received from the equipment, which does not use the reference specification to manage and process management data. Accordingly, the equipment sends data relating to a managed object by sending a respective pattern followed by corresponding data tickets. The management device then determines the object to which the data of the received tickets relates, as a function of the identifier of the pattern and the stored synchronization information. Consequently, the management device and the equipment are able to exchange management data using synchronization information shared by them.

Such features make network management very flexible.

In an implementation of the present invention, the management device also sends patterns and data tickets to the equipment. Under such circumstances, the method further comprises the following steps for managing the given object:

translating by the management device the given object into the respective pattern to which is assigned the respective identifier as a function of the synchronization information;

sending from the management device to the equipment, said pattern to which is assigned the respective identifier and at least a data ticket having a structure indicated by said pattern and assigned said identifier;

receiving and storing on the equipment the data of the received ticket as a function of the pattern to which is assigned the same identifier as said ticket.

This kind of architecture enables complete management of equipments that do not know the reference specification used by the management device in respect of the objects for which the equipment and the management device share synchronization information. The device can then also send to the equipments management requests such as parameter modification requests or information requests by sending patterns and data tickets. The equipments are then able to process directly management requests received in this form to manage their management data.

Such equipments may advantageously be simpler and consequently less costly than equipments containing the reference specification. Furthermore, the transmission bandwidth of the network used for exchanging management data is then advantageously reduced.

Accordingly, if the reference specification is a particular MIB portion, the managed equipment does not need to know that object model and its management data in accordance with the MIB may therefore be exported to another entity of the network via the management device, for example using the SNMP.

The equipment to be managed that has no knowledge of the MIB may advantageously also have no knowledge of the SNMP. Even simpler and less costly equipments to be managed can therefore be produced.

The synchronization information may be received and stored on starting up the management device and/or on starting up the equipment or periodically.

The equipment may also indicate the synchronization information to the management device by means of the following steps:
    from the equipment, respectively from the management device, sending a synchronization pattern indicating a field relating to an object reference and another field relating to a pattern identifier and sending a synchronization ticket comprising the reference of the given object and an identifier of the respective associated pattern;
    storing the data from the synchronization ticket received by the management device, respectively by the equipment.

In one embodiment of the present invention, the equipment further manages management data in the form of objects to be managed referenced in accordance with the reference specification. Under such circumstances, before the sending step, the equipment also translates the object to be managed into the respective pattern to which is assigned a particular identifier as a function of the synchronization information.

A second aspect of the present invention proposes a system for managing equipment in a communications network comprising firstly a management device managing a management information base in the form of objects to be managed, said objects being referenced in accordance with a reference specification, and secondly a managed equipment exchanging management data in the form of data structures indicated by patterns each corresponding to a respective referenced object and being assigned a respective identifier, wherein the management device and the managed equipment each comprise:
    a memory for storing synchronization information associating the identifier of a pattern and the reference of the corresponding object;
    an interface unit for sending and/or receiving a pattern assigned an identifier and a data ticket having a structure indicated by said pattern assigned said identifier; and
wherein the device further comprises:
    a translator comprising means for translating a received pattern into the respective referenced object as a function of the identifier of said pattern and said synchronization information.

A third aspect of the present invention proposes a translator comprising means adapted to operate in an equipment according to the second aspect of the invention.

A fourth aspect of the invention proposes a network management device for managing a management information base in the form of objects to be managed referenced in accordance with a reference specification. The device is adapted to manage an equipment exchanging management data in the form of data structures indicated by patterns each corresponding to a respective referenced object and being assigned a respective identifier.

The device comprises:
    a memory for storing synchronization information associating the identifier of a pattern and the reference of a corresponding object;
    an interface unit for sending and/or receiving a pattern to which is assigned an identifier and a data ticket having a structure indicated by said pattern and assigned said identifier; and
    a translator for translating a received pattern into the respective referenced object as a function of the identifier of said pattern and the synchronization information.

A fifth aspect proposes a network equipment adapted to be managed by a management device managing a management information base in the form of objects to be managed, said objects being referenced in accordance with a reference specification.

The equipment exchanges management data in the form of data structures indicated by patterns, each corresponding to a respective referenced object and to which a respective identifier is being assigned. The equipment comprises:
    a memory for storing synchronization information associating the identifier of a pattern and the reference of a corresponding object; and
    an interface unit for sending and/or receiving a pattern assigned an identifier and a data ticket having a structure indicated by said pattern and assigned said identifier.

Other aspects, objects, and advantages of the invention appear on reading the description of one embodiment thereof.

BRIEF DESCRIPTION OF THE DRAWINGS

The invention can also be better understood in the light of the drawings, in which.

DESCRIPTION OF PREFERRED EMBODIMENTS

In a situation where the equipment sends management data to the management device, one use of an implementation of the invention advantageously offers the flexibility of using an IPFIX-type protocol to send alarms from the equipment to the device. This type of protocol, well known to the person skilled in the art, is conventionally used in a global service for analyzing strings in transit through packet transmission network equipments, in particular IP, ATM, Ethernet, or MPLS (MultiProtocol Label Switching) type routers and switches. This kind of service provides an analysis of the streams entering an equipment.

A system is described below by way of example in which management data can also be sent from the device to the equipment in an implementation of the invention.

Figure 1:
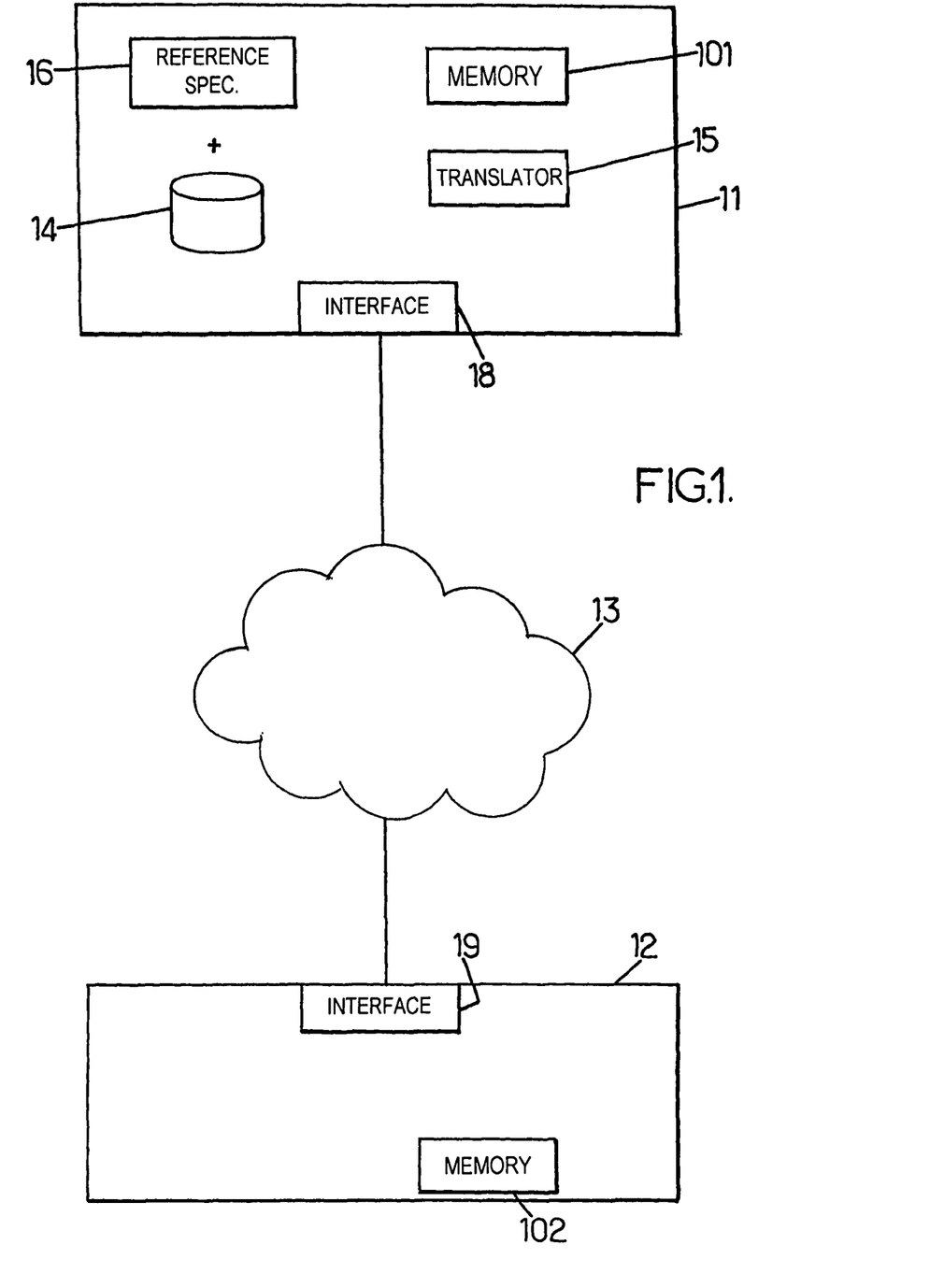
FIG. 1 is a diagram of a system constituting an embodiment of the present invention.

FIG. 1 shows a management device 11 and an equipment 12 to be managed via a network 13 in an embodiment of the present invention.

The device 11 includes a management information base 14 that is managed in accordance with a reference specification 16. A management information base specified in accordance with an MIB portion is generally used. The device 11 further includes a translator 15 adapted to translate data received from the equipment 12 into data conforming to the reference specification and vice-versa. The device 11 is therefore able to receive and process data received from the equipment 12 and in particular it is able to store that data in the database 14.

The management device further includes an interface unit 18 for receiving messages from the equipment 12. It preferably also sends data to the equipment 12. The device also includes a memory 101 for storing synchronization information common to the equipment and to the management device.

The management device and the equipment preferably share stored synchronization information relating to the referenced objects to be managed that correspond to some or all of the resources of the equipment 12 to be managed.

The equipment 12 stores management data that is managed in the form of data structures indicated in patterns. The equipment 11 further includes an interface unit 19 for sending data to the management device 11. It preferably also receives data from the management device 11. Such an interface unit 19 of an equipment can store data to be exported and then export that data when certain export criteria are satisfied. The data export criteria may be a function of the type of equipment, the nature of the MIB portion concerned or client application operating constraints.

The equipment 12 also includes a memory 102 for storing the common synchronization information.

In one embodiment of the present invention, the equipment 12 does not know the MIB portion 16 and the management data is exchanged via the network 13 by sending patterns and data tickets having a structure indicated by the corresponding patterns.

Figure 2:
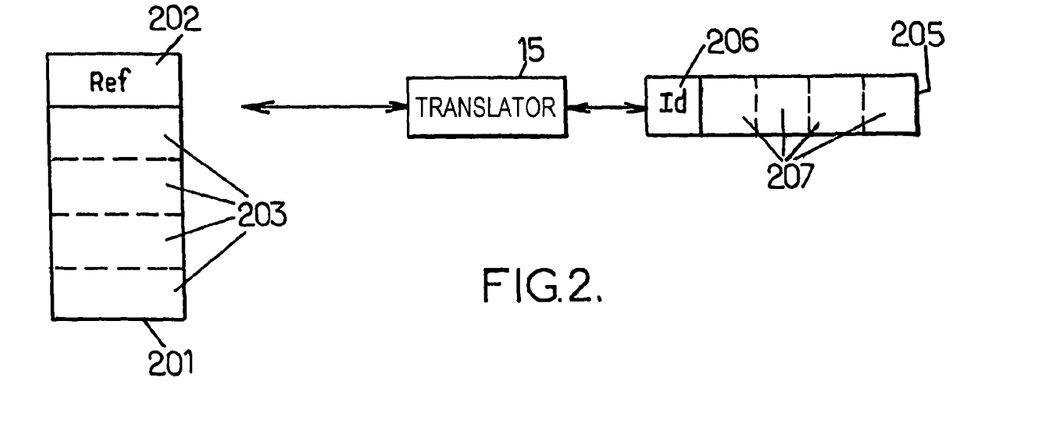
FIG. 2 shows a correspondence in a management data format translation in an implementation of the present invention.

FIG. 2 shows translation by a translator 15 in an implementation of the invention between an object 201 specified in accordance with the reference specification and a pattern 205 indicating the data structures managed by the equipment 12.

The translation is effected by the translator 15 as a function of the synchronization information stored in the memory 101. Accordingly, from the object 201 assigned a reference 202, and comprising information fields 203, a pattern 205 assigned an identifier 206 and comprising information fields 207 derived from the information fields 203 is obtained via the translator. The identifier 206 is determined as a function of the synchronization information.

Note that the equipment does not include a translator of the invention since in this illustrative example the equipment does not know the MIB portion and therefore does not need to use this kind of translator.

The translator is then able to effect a translation from a pattern assigned a particular identifier into the respective object corresponding to that pattern. Thus the translator determines an object reference as a function of the identifier received and the synchronization information. The translator then determines the object corresponding to the received pattern from that reference.

Figure 3:
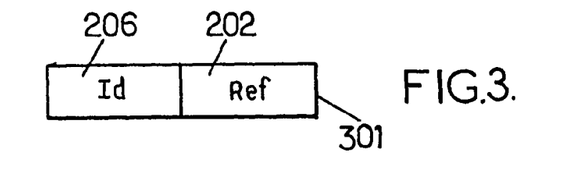
FIG. 3 shows a synchronization ticket in an implementation of the present invention.

FIG. 3 shows a synchronization ticket 301 in an implementation of the present invention that comprises a pattern identifier 206 and an object reference 202. Patterns and objects can therefore be correlated on the basis of this kind of ticket.

Figure 4:
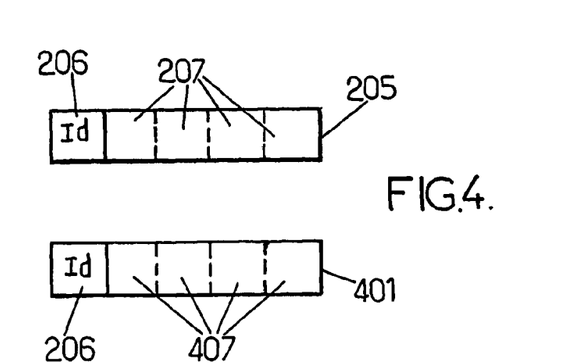
FIG. 4 shows a pattern and a respective data ticket in an implementation of the present invention.

FIG. 4 shows a pattern 205 and a respective data ticket 401 in an implementation of the present invention. The pattern preferably indicates the format and semantics of the fields 407 of the respective data ticket(s). The pattern and the data ticket are assigned the same identifier 206.

Figure 5:
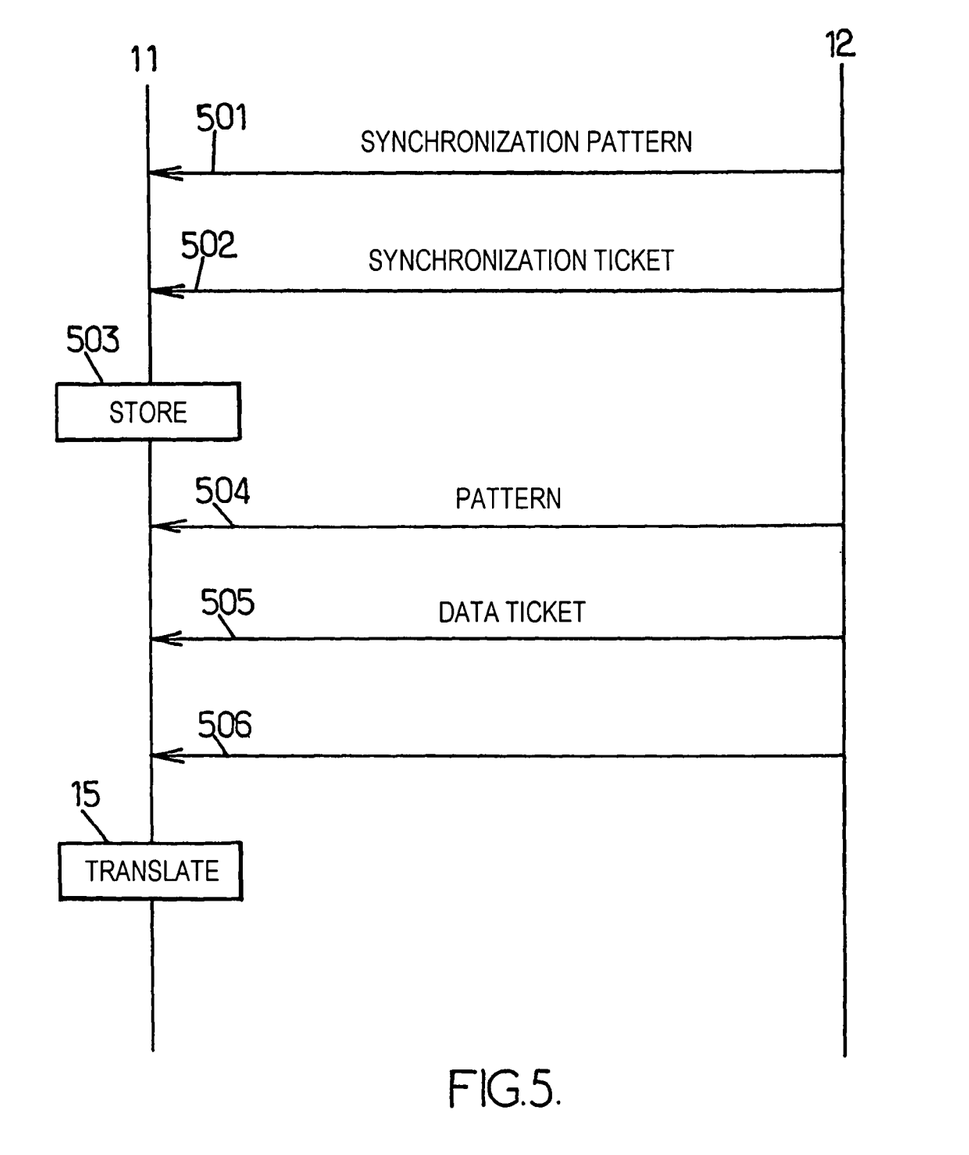
FIG. 5 shows a management method in an implementation of the present invention.

A synchronization ticket can be sent by an entity external to the network, the management device or the equipment. FIG. 5 shows an implementation of the present invention in which the synchronization ticket is sent by the equipment 12. In an implementation of the present invention, the equipment 11 does not know the reference specification. It stores the synchronization information. The present invention covers the various ways of supplying this synchronization information to the equipment.

In order to share this information with the management device 11, the equipment 12 sends the management device 11 a synchronization pattern (501) and then a synchronization ticket (502). The device 11 stores this synchronization information (503). A synchronization pattern is a pattern that is specific, and therefore recognizable, since it does not relate to any object of the reference specification.

In an implementation of the present invention, the equipment sends a synchronization ticket for each item of synchronization information that it wishes to share with the management device.

For example, if the equipment 12 wishes to issue an alarm, it sends the device 11 a pattern (504) indicating the format of the data tickets (505, 506) relating to the alarm that is to follow.

The translator 15 then determines the specified object to which the received pattern relates, as described above. The data received in the tickets (505, 506) assigned the same identifier is then interpreted with reference to the information fields of the pattern and the particular object.

Modification of configuration parameters of an equipment by a management device in an embodiment of the present invention is described below by way of illustrative example.

Thus an operator configures an equipment of the network that has no access to the MIB portion.

Under such circumstances, using the SNMP, an operator sends the management device a configuration command including new parameters relating either to a given object, if it is an individual object, or where applicable to a particular instance of a given specified object.

On reception of these parameters received in accordance with the MIB specification, the management device translates the data received from the operator in order to generate a corresponding pattern. It then sends the equipment the pattern relating to the given object. It then sends one or more data tickets that indicate the parameters received. If the new parameters to be sent relate to a plurality of instances of an object, a plurality of data tickets is sent, preferably one ticket for each instance of the object assigned an index value. The pattern then includes a field relating to an index and each ticket indicates the value of the index corresponding to the instance of the object to which the data from the ticket corresponds.

On receiving the pattern and then the data tickets, the equipment manages the received data directly.

An operator can also request export of management data relating to a managed object of the equipment 12 by sending an SNMP request message to the management device 11. Under such circumstances, the device 11 can interrogate the equipment 12 after the data received from the operator using the SNMP has been translated.

There is described below an embodiment of the present invention applied to the MIB portion with the OID 1.3.6.1.2.1.37 in the object record tree specified by the Internet Engineering Task Force (IETF) in its Request For Comments RFC 1695. This MIB portion is referred to below as the ATM-MIB.

The synchronization information supplied beforehand to the device and to the equipment associates a pattern identifier equal to 309 and the object corresponding to a particular table of the ATM-MIB. Table 1 shows a corresponding synchronization ticket pattern according to one embodiment of the present invention.

TABLE 1

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|

Flowset ID = 0
Length = 60 bytes
Specific synchronization pattern identifier = 100 (arbitrary value)
Number of information fields: 2
Field 1: pattern identifier
Length: 4
Field 2: object reference
Length: 32

This pattern may either be supplied to the device and to the equipment by an external entity or known beforehand. Note that such a pattern indicates the format and the semantics of the synchronization tickets.

Table 2 represents a synchronization ticket in an implementation of the invention establishing a correspondence between the object relating to the ATM-MIB and a respective pattern numerical identifier equal to 309.

TABLE 2

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|

Flowset ID = 100 (MIB pattern)     309     Length = 38 bytes
1.3.
6.1.
2.1.
37
...
...
...
...

Note that the identifier of the pattern included in the synchronization information may be chosen at random.

Table 3 shows a pattern corresponding to this ATM-MIB table in an implementation of the present invention

TABLE 3

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|

Flowset ID = 0
Length = 32 bytes
Pattern identifier = 309 (aa15VccTable)
Number of fields: 6
Field 1: ifindex
Length: 4
Field 2: aa15VccVpi
Length: 2
Field 3: aa15VccVci
Length: 2
Field 4: aa15VccCrcErrors
Length: 4

TABLE 3-continued

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|

Field 5: aa15VccSarTimeOuts
Length: 4
Field 6: aal15VccOverSizedSDUs
Length: 4

The first field FlowsetID equal to 0 indicates a pattern. The second field indicates the length of the pattern. The third field contains the numerical identifier 309 assigned to the pattern. Note that field 1 corresponds to an index field, since a table of this kind may be instantiated, each index defining one instance of the table. In an implementation, this field 1 may correspond to an object from another table. It is present because it belongs to the table aa15VccTable and to an identification key of a Vcc from the instances of the Vcc of a table aa15VccTable. Aa15VccVpi and aa15VccVci complete this key.

The subsequent fields define the semantics and the format of the data of the tickets relating to this pattern that are to follow.

When the management device 11 receives the pattern with the identifier 309, the translator 15 establishes the correspondence between that pattern and the reference of the corresponding object. With reference to the MIB specification, the correspondence of the pattern received to the corresponding table of the ATM-MIB is then established.

Table 4 represents a data ticket relating to the pattern represented by Table 3.

TABLE 4

| Flowset ID = 309 (aa15VccTable) | Length: 12 |
|---|---|
| | 12 |
| 100 | 1000 |
| 15432 | |
| 456 | |
| 567 | |

The first and second fields of the first row respectively indicate the identifier of the pattern corresponding to this data ticket and the length of that data ticket.

If the object is instantiated, there may a plurality of data tickets corresponding to that object, one ticket per instance. The second and third rows of the ticket identify the instance of the object concerned. The subsequent values then correspond to the successive fields indicated in the Table 4 pattern.

A data ticket preferably corresponds to a single instance of a specified object.

There follows a detailed description of the translation of data tickets received by the translator of a management device according to one embodiment of the present invention.

Thus the translator receives data tickets as described above. Either the specification of the MIB portion concerned is available to the translator or it is loaded by the translator from an external unit.

The device constructs a "naming tree" of the objects from the specification of the MIB portion. The management device constructs a database associated with that object naming tree for storing the data received and translated in order to make it accessible via SNMP.

Data relating to individual objects is preferably not managed by the management device in the same way as data relating to instances of objects, in the form of tables.

Thus the translator may create from the naming tree and the synchronization information a first table relating to data corresponding to individual objects and a second table relating to data corresponding to instantiated objects.

On the basis of these tables, the translator is able, on receiving patterns and data tickets, to interpret the data received from the equipment and to store it in accordance with the ATM-MIB in order to make it accessible via the SNMP.

Regardless of how each pattern is assigned an identifier, provided that the equipment and the management device share synchronization information, they are able to exchange management data relating to the synchronization information in the manner described above.

One implementation advantageously synchronizes the equipment and the management device more than once, if necessary.

Note that if an IPFIX type protocol is used to send management data across the network, the "options template flowset" pattern defined by IPFIX may advantageously be used as a synchronization pattern in one embodiment of the present invention.

Thus the present invention makes the use of a management method in a network more flexible.

It advantageously also enables simple network equipments to be managed to be manufactured at low cost.

Moreover, an embodiment of the invention is very simple to implement in existing networks.

The invention claimed is:

1. A method of managing an equipment by a management device in a communications network, comprising:
   managing, with said management device, a management information base in the form of referenced objects conforming to a reference specification;
   according to a first protocol, exchanging, with said equipment, management data in the form of data structures indicated by patterns each of which corresponds to a respective referenced object and is assigned a respective identifier,
   wherein, the data structures indicated by patterns according to the first protocol are different from data structures defined by the reference specification;
   wherein, for managing a given object, the management device and the equipment store the same synchronization information, said synchronization information associates a reference of the given object and an identifier of a corresponding pattern;
   sending, from the equipment to the management device, the corresponding pattern to which the identifier is assigned and a data ticket having a structure indicated by said pattern and assigned said identifier; and
   translating the corresponding pattern received by the management device into the respective referenced object as a function of said synchronization information and,
   based on the translation, storing data included in the data ticket in the management information base of the management device,
   wherein the synchronization information is received and stored on starting up the management device or on starting up the equipment and wherein said first protocol is the IPFIX protocol employing the options template flowset pattern as a synchronization pattern.

2. The method according to claim 1, further comprising:
   translating, by the management device, the given object into the corresponding pattern to which is assigned the respective identifier as a function of the synchronization information;
   sending, from the management device to the equipment, said pattern to which is assigned the respective identifier and at least a data ticket having a structure indicated by said pattern and to which is assigned said identifier; and
   receiving and storing, on the equipment, the data included in the data ticket as a function of the pattern to which is assigned the respective identifier of said ticket.

3. The method according to claim 1, wherein the synchronization information is received and stored periodically by the management device or the equipment.

4. The method according to claim 1, wherein the equipment indicates synchronization information to the management device and the management device indicates synchronization information to the equipment, by:
   sending, from the equipment and from the management device, respectively, a synchronization pattern indicating a field relating to an object reference and another field relating to a pattern identifier;
   sending a synchronization ticket comprising said synchronization information; and
   storing data from the synchronization ticket received by the management device and, by the equipment, respectively.

5. The method according to claim 1,
   wherein the equipment further manages management data in the form of objects to be managed referenced in accordance with the reference specification, and
   wherein before the sending step, the equipment also translates the object to be managed into the corresponding pattern to which is assigned a particular identifier as a function of the synchronization information.

6. A system for managing equipment in a communication network comprising a management device managing a management information base in the form of objects to be managed, said objects being referenced in accordance with a reference specification, and a managed equipment exchanging management data according to a first protocol in the form of data structures indicated by patterns each corresponding to a respective referenced object and to which a respective identifier is being assigned, wherein the management device and the managed equipment each comprise:
   a memory adapted to store synchronization information, wherein the synchronization information associates the identifier of a pattern and the reference of the corresponding object wherein said memory is also adapted to receive and store the synchronization information on starting up the management device or on starting up the equipment;
   an interface unit adapted to send or receive a pattern assigned an identifier and a data ticket having a structure indicated by said pattern assigned said identifier; and
   wherein the device further comprises:

a translator adapted to translate a received pattern into the respective referenced object as a function of the identifier of said pattern and said synchronization information, wherein the data structures indicated by patterns according to the first protocol are different from data structures defined by the reference specification and wherein the first protocol is the IPFIX protocol employing the options template flowset pattern as a synchronization pattern.

7. The system according to claim 6, wherein the translator is further adapted to translate an object to be administered into a respective pattern assigned an identifier as a function of the synchronization information.

8. A translator adapted to operate in a management system according to claim 6.

9. A network management device for managing a management information base in the form of objects to be managed, said objects referenced in accordance with a reference specification, said device being adapted to manage an equipment exchanging management data, according to a first protocol, in the form of data structures indicated by patterns each corresponding a respective referenced object and being assigned a respective identifier, said device comprising:

a memory adapted to store synchronization information, wherein synchronization information associates the identifier of a given pattern and the reference of a corresponding object, wherein said memory is also adapted to receive and store the synchronization information on starting up the management device;

an interface unit adapted to carryout sending or receiving a pattern to which is assigned an identifier and a data ticket having a structure indicated by said pattern and assigned said identifier; and a translator adapted to translate a received pattern into the respective referenced object as a function of the identifier of said pattern and the synchronization information, wherein the data structures indicated by patterns according to the first protocol are different from data structures defined by the reference specification and wherein the first protocol is the IPFIX protocol employin the options template flowset pattern as a synchronization pattern.

10. The management device according to claim 9, wherein the translator is further adapted to translate an object to be managed into a respective pattern assigned a particular identifier as a function of the synchronization infoundation.

11. A network equipment adapted to be managed by a management device managing a management information base in the form of objects to be managed, said objects being referenced in accordance with a reference specification, an equipment exchanging management data, according to a first protocol, in the form of data structures indicated by patterns each corresponding to a respective referenced object and to which a respective identifier is being assigned, said equipment comprising:

a memory adapted to store synchronization information, wherein the synchronization information associates the identifier of a given pattern and the reference of a corresponding object, wherein said memory is also adapted to receive and store the synchronization information on starting up the equipment; and an interface unit adapted to send or receive a pattern assigned an identifier and a data ticket having a structure indicated by said pattern and assigned said identifier, wherein the data structures indicated by patterns according to the first protocol are different from data structures defined by the reference specification and wherein the first protocol is the IPFIX protocol employing the options template flowset pattern as a synchronization pattern.

12. The equipment according to claim 11, wherein management data is managed in the form of objects to be managed referenced in accordance with the reference specification, said equipment further comprising a translator adapted to translate an object to be managed into a respective pattern or translating a respective pattern into an object to be managed.

* * * * *

UNITED STATES PATENT AND TRADEMARK OFFICE
CERTIFICATE OF CORRECTION

| | | |
|---|---|---|
| PATENT NO. | : 9,100,267 B2 | Page 1 of 1 |
| APPLICATION NO. | : 11/666278 | |
| DATED | : August 4, 2015 | |
| INVENTOR(S) | : Emile Stephan | |

It is certified that error appears in the above-identified patent and that said Letters Patent is hereby corrected as shown below:

IN THE SPECIFICATION

In column 7 at line 52 (approx.), Change "invention" to --invention.--.

IN THE CLAIMS

In column 12 at line 1, In Claim 9, change "employin" to --employing--.

In column 12 at line 7 (approx.), In Claim 9, change "infoundation." to --information.--.

Signed and Sealed this
Eighth Day of March, 2016

Michelle K. Lee
*Director of the United States Patent and Trademark Office*